United States Patent
Aoki et al.

(10) Patent No.: US 9,050,902 B2
(45) Date of Patent: Jun. 9, 2015

(54) HYBRID VEHICLE AND METHOD FOR CONTROLLING HYBRID VEHICLE

(71) Applicants: Kazuma Aoki, Toyota (JP); Koji Hokoi, Toyota (JP); Hiroki Endo, Nissin (JP)

(72) Inventors: Kazuma Aoki, Toyota (JP); Koji Hokoi, Toyota (JP); Hiroki Endo, Nissin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/244,271

(22) Filed: Apr. 3, 2014

(65) Prior Publication Data
US 2014/0303818 A1   Oct. 9, 2014

(30) Foreign Application Priority Data

Apr. 8, 2013   (JP) .................................. 2013-080417

(51) Int. Cl.
*B60L 11/18*   (2006.01)

(52) U.S. Cl.
CPC .......... *B60L 11/1861* (2013.01); *Y10S 903/903* (2013.01); *Y02T 10/7011* (2013.01)

(58) Field of Classification Search
CPC .......................... B60L 11/1861; Y10S 903/903
USPC ......................................................... 701/22
See application file for complete search history.

(56) References Cited

U.S. PATENT DOCUMENTS

2002/0113595 A1*  8/2002  Sakai et al. ................... 324/433
2010/0030416 A1   2/2010  Jinno

FOREIGN PATENT DOCUMENTS

JP    2008-168860 A    7/2008
JP    2011-093335 A    5/2011

* cited by examiner

*Primary Examiner* — Mary Cheung
*Assistant Examiner* — Yuen Wong
(74) *Attorney, Agent, or Firm* — Sughrue Mion, PLLC (57) ABSTRACT

Provided are a hybrid vehicle and control method thereof. The hybrid vehicle has a power storage device, an internal combustion engine, a power generation device, an input device and an electronic control unit. The electronic control unit is configured to control charging of the power storage device by the power generation device in such a manner that charging of the power storage device is promoted when an increase of the power storage amount is requested through the input device, and in a state where an increase of the power storage amount has been requested through the input device, to suppress charging of the power storage device when a travel load is small, as compared to when the travel load is large, and to mitigate suppression of charging of the power storage device when a predefined condition is met during suppression of charging of the power storage device.

12 Claims, 8 Drawing Sheets

HYBRID VEHICLE AND METHOD FOR CONTROLLING HYBRID VEHICLE

INCORPORATION BY REFERENCE

The disclosure of Japanese Patent Application No. 2013-080417 filed on Apr. 8, 2013 including the specification, drawings and abstract is incorporated herein by reference in its entirety.

BACKGROUND OF THE INVENTION

1. Field of the Invention

The invention relates to a hybrid vehicle, and more particularly, to a hybrid vehicle that is provided with a power generation device charging a power storage device by using the output of an internal combustion engine, and relates to a method for controlling the hybrid vehicle.

2. Description of Related Art Japanese Patent Application Publication No. 2011-93335 (JP 2011-93335 A) discloses a hybrid vehicle having installed therein a power generator which generates charging power of a power storage device using the output of an internal combustion engine. Upon detection of a charging request, by a user, of increasing a power storage amount of a power storage device in the hybrid vehicle, the output of the internal combustion engine is increased compared with when no charging request is detected, in such a manner that charging of the power storage device is promoted.

In addition to conventional charge and discharge control in which the power storage amount of the power storage device is maintained at a target, this hybrid vehicle allows realizing charge and discharge management of the power storage device in accordance with the user's intention, such as increasing beforehand the power storage amount in case EV travel (travel relying on an electric motor alone, with the internal combustion engine stopped) or a power mode is selected (JP 2011-93335 A).

Increasing the power storage amount of a power storage device encompasses instances where the power storage amount is to be increased as quickly as possible, and instances where the power storage amount is to be increased as efficiently as possible. In other instances, noise and vibration (NV) generated by the internal combustion engine during operation of the latter for the purpose of power generation may be a concern (worsening NV characteristics). These considerations are not addressed in JP 2011-93335 A above.

SUMMARY OF THE INVENTION

In the light of the above issues, it is an object of the invention to provide a hybrid vehicle and a control method thereof wherein consideration can be given to efficiency and NV characteristics upon an increase of a power storage amount of a power storage device in response to a request by a user.

In one aspect of the invention, accordingly, there is provided a hybrid vehicle that has a power storage device, an internal combustion engine, a power generation device, an input device and an electronic control unit. The power generation device is configured so as to generate charging power of the power storage device by using an output of the internal combustion engine. The input device is a device configured to to request an increase of a power storage amount of the power storage device by a user input. The electronic control unit is configured to control charging of the power storage device by the power generation device in such a manner that charging of the power storage device is promoted when the increase of the power storage amount is requested through the input device. The electronic control unit is configured to, in a state where the increase of the power storage amount has been requested through the input device, suppress charging of the power storage device when a travel load is small in comparison to when the travel load is large, and mitigate suppression of charging of the power storage device when a predefined condition is met during suppression of charging of the power storage device.

In the hybrid vehicle, the electronic control unit may be configured to suppress charging of the power storage device by increasing a state where the power generation device is stopped, when the travel load is small in comparison to when the travel load is large.

In the hybrid vehicle, the electronic control unit may have a charging promotion control unit and a mode control unit. The charging promotion control unit may be configured to control charging of the power storage device by the power generation device in such a manner that charging of the power storage device is promoted when the increase of the power storage amount is requested through the input device. The mode control unit may be configured to control switching between a strong charging mode in which the power storage amount is increased early on, during execution of charging control by the charging promotion control unit, and a weak charging mode in which charging of the power storage device by the power generation device is suppressed when the travel load is small, in comparison to when the travel load is large, and the mode control unit may be configured to switch from the weak charging mode to the strong charging mode when the predefined condition is met during the weak charging mode.

In the hybrid vehicle, the predefined condition may be that the weak charging mode has continued for a predefined time. The predefined condition may be that non-execution of charging of the power storage device by the power generation device has continued for a predefined time.

In the hybrid vehicle, the predefined condition may be that the power storage amount of the power storage device decreases by a predefined amount while the weak charging mode is selected.

In the hybrid vehicle, the predefined condition may be that the hybrid vehicle has traveled a predefined distance while the weak charging mode is selected.

In the hybrid vehicle, the internal combustion engine may be configured to start when the travel load increases and to stop when the travel load decreases. The charging promotion control unit may be configured to execute charging of the power storage device by the power generation device, during operation of the internal combustion engine in accordance with the travel load, when the weak charging mode has been selected by the mode control unit.

In the hybrid vehicle, the mode control unit may be configured to switch between the strong charging mode and the weak charging mode based on an input through the input device.

In the hybrid vehicle, the electronic control unit may be configured to control charging of the power storage device by the power generation device so as to increase a state of charge of the power storage device, when the increase of the power storage amount is requested through the input device.

In the hybrid vehicle, the electronic control unit may be configured to control charging of the power storage device by the power generation device so as to increase a charge rate of the power storage device, when the increase of the power storage amount is requested through the input device.

In another aspect of the invention there is provided a method for controlling a hybrid vehicle, as described below. The hybrid vehicle has a power storage device, an internal combustion engine, a power generation device generating charging power of the power storage device by using the output of the internal combustion engine, and an input device for enabling a user to request an increase of a power storage amount of the power storage device. The control method includes: controlling charging of the power storage device by the power generation device in such a manner that charging of the power storage device is promoted when the increase of the power storage amount is requested through the input device; suppressing charging of the power storage device when a travel load is small in comparison to when the travel load is large, and mitigating suppression of charging of the power storage device when a predefined condition is met during suppression of charging of the power storage device, in a state where the increase of the power storage amount has been requested through the input device.

In the hybrid vehicle and control method thereof of the invention, as described above, there is provided an input device for enabling a user to request an increase of a power storage amount of the power storage device. The power storage device is charged by the power generation device in such a manner that charging of the power storage device is promoted when the increase of the power storage amount is requested through the input device (charging promotion control). In this charging promotion control, charging of the power storage device is suppressed when the travel load is small, as compared to when the travel load is large. Accordingly, also the output of the engine is limited when the travel load is small, and hence there is suppressed operation of the engine at a low load, which entails low efficiency and worse NV characteristics. The invention succeeds therefore in providing a hybrid vehicle and a control method thereof wherein consideration can be given to efficiency and NV characteristics upon an increase of a power storage amount of a power storage device in response to a request by a user.

In the hybrid vehicle and control method thereof as described above, suppression of charging of the power storage device is mitigated when a predefined condition is met during suppression of charging of the power storage device. Accordingly, a situation is avoided where charging of the power storage device is not promoted due to a continued state of small travel load. Therefore, the invention allows increasing the power storage amount of the power storage device in response to a request by the user, even for a continued state of small travel load.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be explained next in detail with reference to accompanying drawings. Identical and equivalent portions in the figures are denoted by identical reference numerals, and a recurrent explanation thereof will be omitted.

Figure 1:
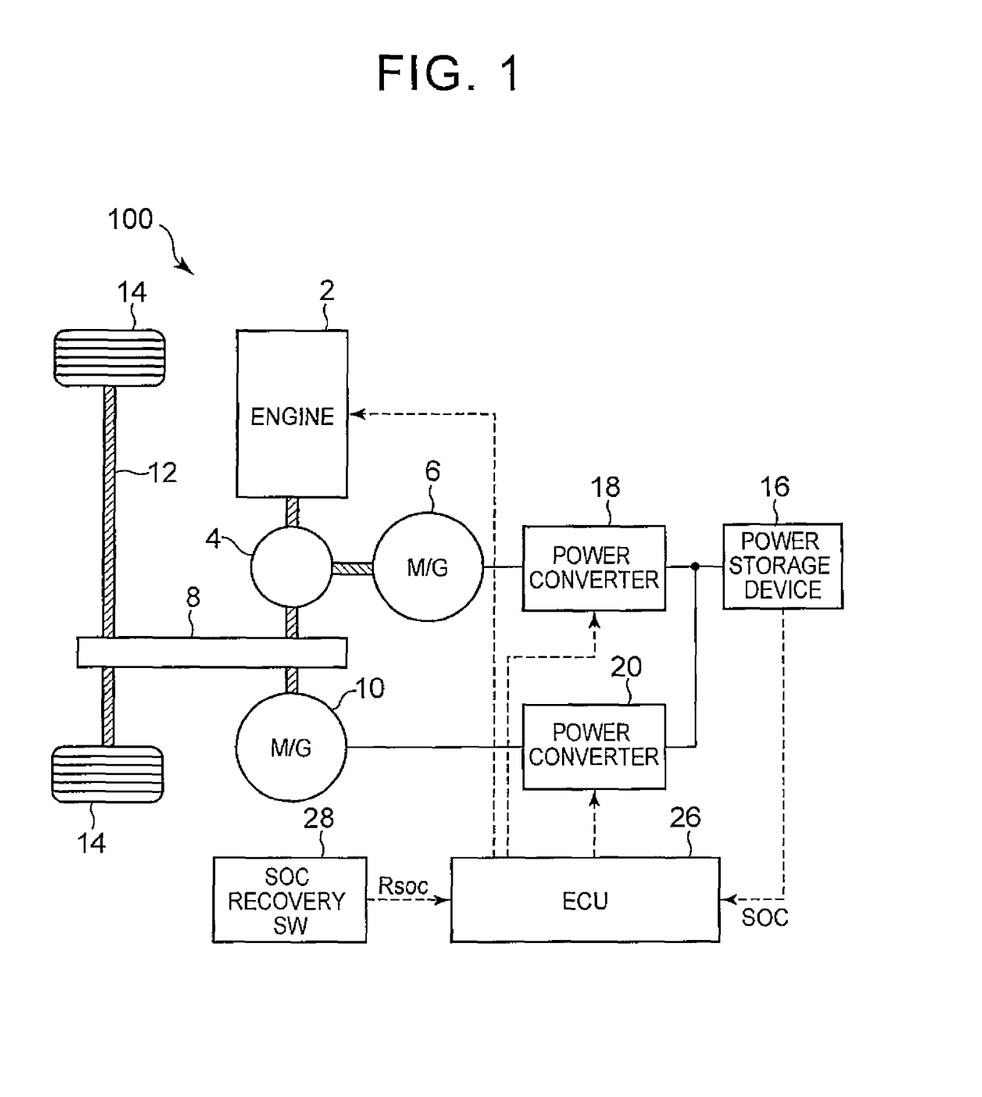
FIG. 1 is an overall block diagram of a hybrid vehicle according to an embodiment of the invention.

FIG. 1 is an overall block diagram of a hybrid vehicle according to an embodiment of the invention. With reference to FIG. 1, a hybrid vehicle 100 is provided with an engine 2, a motive power split device 4, motor-generators 6, 10, a transmission gear 8, a drive shaft 12 and wheels 14. The hybrid vehicle 100 is further provided with a power storage device 16, power converters 18, 20, an ECU 26 as an example of an electronic control unit, and a SOC recovery switch 28.

The motive power split device 4 is connected to the engine 2, the motor-generator 6 and the transmission gear 8, and distributes motive power among the foregoing. For instance, a planetary gear having three rotating shafts of a sun gear, a planetary carrier and a ring gear, is used as the motive power split device 4. The above three rotating shafts are respectively connected to the rotating shafts of the motor-generator 6, the engine 2 and the transmission gear 8. The rotating shaft of the motor-generator 10 is connected to the rotating shaft of the transmission gear 8. Specifically, the motor-generator 10 and the transmission gear 8 have a same rotating shaft that is connected to the ring gear of the motive power split device 4.

The kinetic energy generated by the engine 2 is distributed, by the motive power split device 4, to the motor-generator 6 and the transmission gear 8. The engine 2 is built, into the hybrid vehicle 100, as a motive power source that drives the motor-generator 6 and that drives the transmission gear 8, which transmits motive power to the drive shaft 12. The motor-generator 6 is built, into the hybrid vehicle 100, as a motor-generator that operates as a power generator driven by the engine 2, and that operates also as an electric motor that is capable of starting the engine 2. The motor-generator 10 is built, into the hybrid vehicle 100, as a motive power source that drives the transmission gear 8, which transmits motive power to the drive shaft 12.

The power storage device 16 is a rechargeable direct current (DC) power source configured in the form of, for instance, a secondary battery such as a nickel hydride or lithium ion secondary battery. The power storage device 16 supplies power to the power converters 18, 20. The power storage device 16 is charged by receiving power that is generated by the motor-generator 6 and/or 10. A large-capacity capacitor may be used as the power storage device 16. Any such capacitor may be used so long as it is a power buffer capable of temporarily storing power generated by the motor-generators 6, 10, and of supplying the stored power to the motor-generators 6, 10. The voltage of the power storage device 16 may be, for instance, about 200 V.

The power storage device 16 calculates a state of charge (hereafter referred to as "SOC") of the power storage device 16, based on storage voltage and input-output current, and outputs that calculated SOC to the ECU 26. The SOC indicates, within a range of 0 to 100%, the power storage amount of the power storage device 16 with respect to that in a full-charge state, and denotes the remaining capacity of the power storage device 16. The voltage and input-output current of the power storage device 16 are respectively detected by a voltage sensor and a current sensor, not shown. Detection values of the voltage and input-output current of the power storage device 16 are outputted by the power storage device 16 to the ECU 26. The ECU 26 may then calculate the SOC.

Based on a control signal received from the ECU 26, the power converter 18 converts power generated by the motor-generator 6 to DC power, and outputs the latter to the power storage device 16. Based on a control signal received from the ECU 26, the power converter 20 converts the DC power supplied from the power storage device 16 to alternating current (AC) power, and outputs the latter to the motor-generator 10.

Upon start of the engine 2, the power converter 18' converts the DC power supplied by the power storage device 16 to AC power, and outputs the latter to the motor-generator 6. During braking of the vehicle or during reduction of acceleration on a downslope, the power converter 20 converts the power generated by the motor-generator 10 to DC power, and outputs the latter to the power storage device 16. The power converters 18, 20 are made up of inverters. A respective converter that boosts the input voltage of the power converters 18, 20 to be equal to or higher than the voltage of the power storage device 16 may be provided between the power storage device 16 and the power converters 18, 20.

The motor-generators 6, 10, which are AC motors, are for instance made up of a three-phase AC synchronous electric motor in which permanent magnets are embedded in a rotor. The motor-generator 6 converts the kinetic energy generated by the engine 2 to electrical energy, and outputs the latter to the power converter 18. The motor-generator 6 generates a driving force using the three-phase AC power received from the power converter 18, and starts the engine 2 thereby.

The motor-generator 10 generates driving torque of the vehicle using the three-phase AC power received from the power converter 20. During braking of the vehicle or during reduction of acceleration on a downslope, the motor-generator 10 converts mechanical energy stored in the vehicle in the form of kinetic energy or potential energy to electrical energy, and outputs the latter to the power converter 20.

The engine 2 converts thermal energy derived from fuel combustion to kinetic energy of moving elements such as pistons and rotors, and outputs the converted kinetic energy to the motive power split device 4. For instance, the moving elements may be pistons such that, if the motion thereof is reciprocating, that reciprocating motion is converted to rotating motion by way of a so-called crank mechanism through which kinetic energy of the pistons is transmitted thus to the motive power split device 4.

The ECU 26 has, for instance, a central processing unit (CPU), a storage device and an input-output buffer (not shown). The ECU 26 receives the input of various signals from, for instance, the SOC recovery switch 28 and the power storage device 16, and outputs various control signals to respective devices, to control thus the various devices in the hybrid vehicle 100. Control by the ECU 26 is not limited to software processing, and processing may be accomplished by relying on dedicated hardware (electronic circuitry).

The ECU 26 controls the power converter 20 in such a manner that the engine 2 is stopped and the vehicle travels using the motor-generator 10 alone (EV travel), when the travel load is small and the efficiency of the engine 2 decreases, for instance when the vehicle is stopped or during low-speed travel. When the travel load increases and the engine 2 can be run with good efficiency, the ECU 26 starts the engine 2 and controls the engine 2 and the power converters 18, 20 in such a manner that the vehicle travels using the engine 2 and the motor-generator 10 (hybrid vehicle (HV) travel).

When the SOC received from the power storage device 16 drops below a predefined target, the ECU 26 controls the engine 2 and the power converter 18 in such a manner that the motor-generator 6 generates power using the output of the engine 2, to charge the power storage device 16 thereby. During vehicle braking or during reduction of acceleration on a downslope, the ECU 26 controls the power converter 20 in such a manner that there is performed regenerative power generation by the motor-generator 10.

Upon reception of a request signal Rsoc from the SOC recovery switch 28 (described below), the ECU 26 executes charging control (charging promotion control) in which the engine 2 and the motor-generator 6 are utilized, in such a manner that charging of the power storage device 16 is promoted. Herein, charging promotion control involves increasing a SOC control target beyond an ordinary one (during non-execution of charging promotion control), or increasing the charge rate of the power storage device 16 beyond the ordinary one (amount of charge per unit time). Charging promotion control differs from ordinary charging control in that SOC during HV travel is maintained at a fixed control target.

The purpose of the SOC recovery switch 28 is to enable the user to request an increase of the power storage amount of the power storage device 16. Through operation of the SOC recovery switch 28, the user can request, to the vehicle, an increase of the power storage amount of the power storage device 16 in preparation for selecting EV travel through operation of an EV travel request switch (not shown) provided separately, or for selecting power travel (travel mode with enhanced vehicle acceleration performance with respect to depression of the accelerator pedal) through operation of a power mode switch (not shown). The request signal Rsoc is outputted to the ECU 26 by the SOC recovery switch 28 when the latter is operated by the user. The user may be enabled to request an increase of the power storage amount through the use of, for instance, voice input means, instead of the SOC recovery switch 28.

The user can select two charging modes by operating the SOC recovery switch 28. One mode is a "strong charging mode" in which the SOC increases early on. Upon selection of the strong charging mode through the SOC recovery switch 28, the ECU 26 controls the engine 2 and the power converter 18 in such a manner that the engine 2 is started immediately and the motor-generator 6 is operated, so as to forcibly charge the power storage device 16 thereby.

The other mode is a "weak charging mode" wherein charging of the power storage device 16 is suppressed, when the travel load is small, as compared to when the travel load is large. Upon selection of the weak charging mode through the SOC recovery switch 28, the ECU 26 controls the engine 2 and the power converter 18 in such a manner that the SOC is increased when the engine 2 is operating in accordance with the travel load. The purpose of the weak charging mode as well is to increase SOC. Upon selection of the weak charging mode, the SOC control target is increased, or the charge rate of the power storage device 16 is increased, with respect to those in ordinary SOC control, where there is no SOC increase request.

Figure 2:
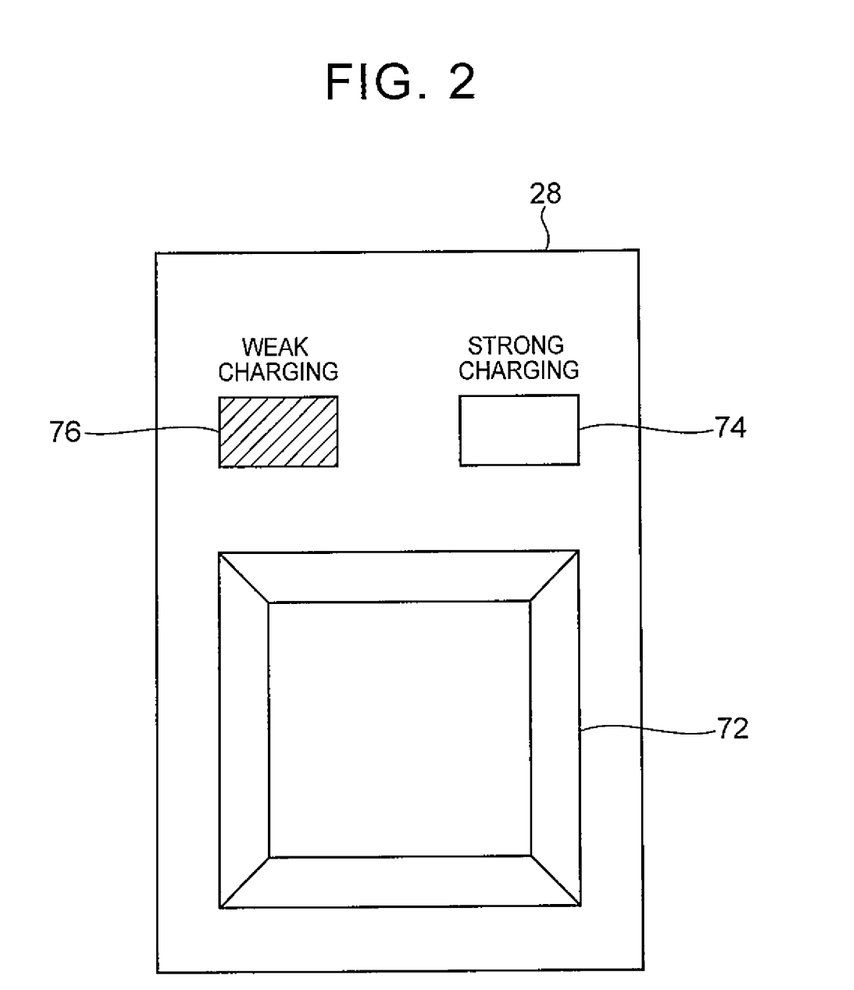
FIG. 2 is a diagram illustrating an example of the external form of a SOC recovery switch.
Figure 3:
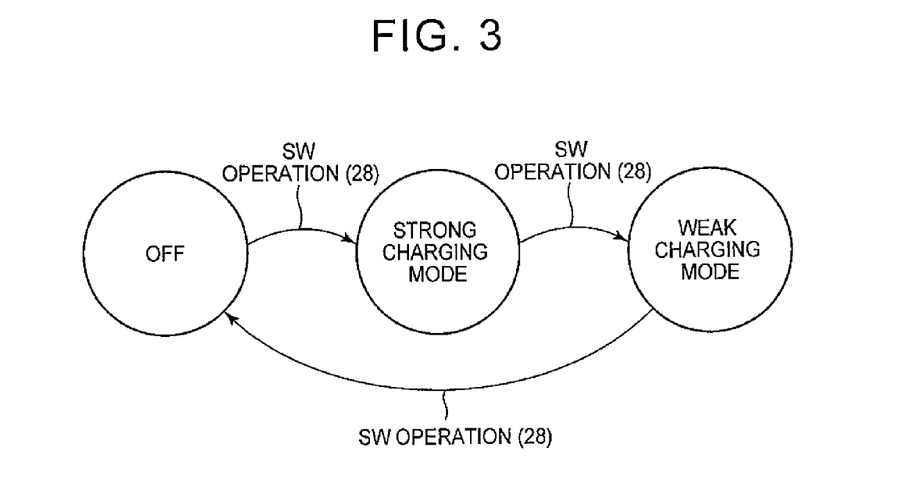
FIG. 3 is a diagram illustrating mode transitions upon operation of the SOC recovery switch.

FIG. 2 is a diagram illustrating an example of the external form of the SOC recovery switch 28. FIG. 3 is a diagram illustrating mode transitions upon operation of the SOC recovery switch 28. With reference to FIG. 2 and FIG. 3, the SOC recovery switch 28 has an operation unit 72 and display units 74, 76. The strong charging mode, the weak charging mode and an off state (state of non-request of power storage amount increase) are switched over in this order every time that the user operates the operation unit 72. The order of the strong charging mode and the weak charging mode may be swapped.

The ECU 26 notifies to the SOC recovery switch 28 which mode from among the strong charging mode, the weak charging mode and the off state is selected. The display unit 74 lights up upon selection of the strong charging mode, and the display unit 76 lights up upon selection of the weak charging mode.

With reference back to FIG. 1, when the strong charging mode is selected, the ECU 26 activates the engine 2, regardless of the travel load of the vehicle, and executes charging promotion control of charging the power storage device 16 using the engine 2 and the motor-generator 6, to promote thereby charging of the power storage device 16. The power storage amount in the power storage device 16 can be recovered early on as a result.

When the weak charging mode is selected, the ECU 26 executes charging promotion control of charging the power storage device 16 using the engine 2 and the motor-generator 6, during operation of the engine in accordance with the travel load, to promote thereby charging of the power storage device 16. When the travel load is small, the ECU 26 stops the engine 2 and controls the power converter 20 in such a manner that the vehicle runs in EV travel using the motor-generator 10 alone, even if the weak charging mode is selected. Upon start of the engine 2 as the travel load increases, the ECU 26 executes the above-described charging promotion control using the engine 2 and the motor-generator 6.

The ECU 26 measures the duration of the weak charging mode over the period of time during which the weak charging mode is selected. Once the weak charging mode has continued for a predefined time, the ECU 26 switches the weak charging mode to the strong charging mode, regardless of the operation of the SOC recovery switch 28. In the weak charging mode the engine 2 stops when the travel load is small. Therefore, the power storage amount does not increase in a case where low-load travel persists, and hence the request of the user cannot be satisfied. In the present embodiment, accordingly, the mode is forcibly changed over to the strong charging mode and the engine 2 is started, to charge the power storage device 16 thereby, when the weak charging mode has continued for a predefined time. As a result there is achieved the increase in power storage amount, which was the original request of the user. The predefined time is set beforehand, as appropriate, but a configuration may be resorted to wherein the predefined time can be set by the user.

In the above explanation the various control items are executed by one integrated ECU 26, but the ECU may be configured broken up, for instance, into an ECU for controlling the engine, an ECU for controlling the motor-generators 6, 10 (power converters 18, 20), and an ECU for monitoring the power storage device 16.

Figure 4:
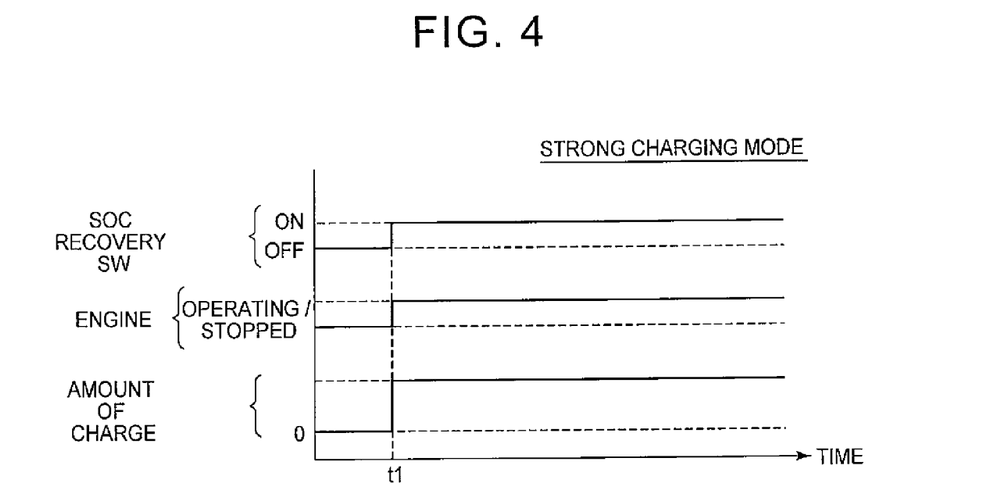
FIG. 4 is a timing chart illustrating a charging operation at the time of a strong charging mode illustrated in FIG. 3.

FIG. 4 is a timing chart illustrating a charging operation at the time of strong charging mode. With reference to FIG. 4, the engine 2 starts at time t1, upon selection of the strong charging mode through an on-operation of the SOC recovery switch 28. The motor-generator 6 generates power using the output of the engine 2, and the power storage device 16 is charged with a predefined amount of charge, in such a manner that charging of the power storage device 16 is promoted.

Figure 5:
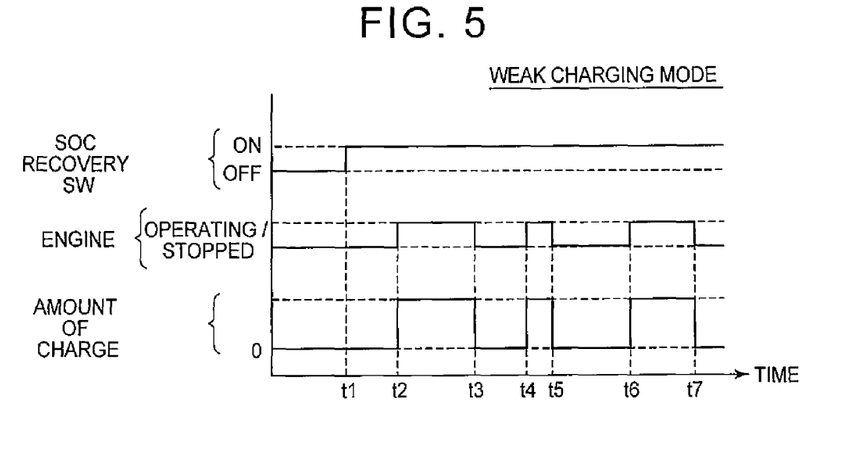
FIG. 5 is a timing chart illustrating a charging operation at the time of a weak charging mode illustrated in FIG. 3.

FIG. 5 is a timing chart illustrating a charging operation at the time of weak charging mode. With reference to FIG. 5, at time t1 the weak charging mode is selected through on-operation of the SOC recovery switch 28. At this point in time, the travel load is small and the engine 2 remains stopped. Further, the engine 2 is not started immediately at this timing.

At time t2, the engine 2 starts as a result of increasing travel load; thereupon, the motor-generator 6 generates power using the output of the engine 2, and the power storage device 16 is charged with a predefined amount of charge, in such a manner that charging of the power storage device 16 is promoted.

The power storage device 16 is charged by relying on the engine 2 and the motor-generator 6, in order to maintain SOC, also in a case where the SOC recovery switch 28 is off (during non-selection of the strong charging mode/weak charging mode). When the weak charging mode is selected, however, the SOC control target is increased to be higher than that at normal times, or the charge rate of the power storage device 16 is increased to be higher than that at normal times.

At time t3 the engine 2 stops, on account of a lowering of travel load, whereupon charging of the power storage device 16 is discontinued as well. In the weak charging mode, thus, the power storage device 16 is not forcibly charged through continuous operation of the engine 2, as in the strong charging mode; instead, charging of the power storage device 16 is discontinued when the engine 2 stops accompanying a decrease of the travel load. It becomes as a result possible to avoid drops in efficiency derived from performing charging at a low-efficiency operating point of the engine 2, and to avoid worsening of NV derived from the operation of the engine 2 at a low travel load, even though SOC recovery is slower than that in the strong charging mode.

Figure 6:
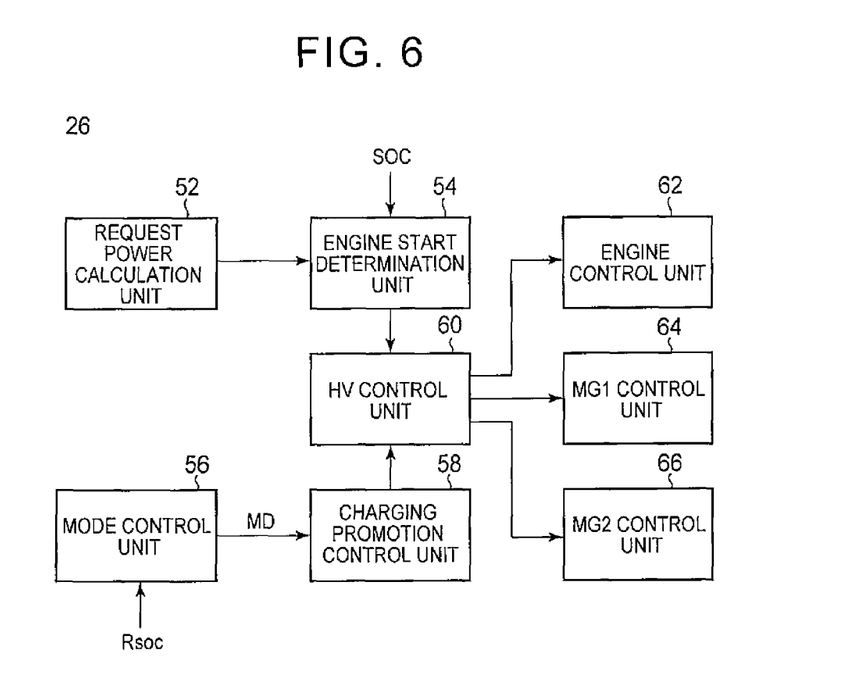
FIG. 6 is a block diagram illustrating functionally the configuration of an electronic control unit (ECU) illustrated in FIG. 1.

FIG. 6 is a block diagram illustrating functionally the configuration of the ECU 26 illustrated in FIG. 1. With reference to FIG. 6, the ECU 26 has a request power calculation unit 52, an engine start determination unit 54, a mode control unit 56, a charging promotion control unit 58, an HV control unit 60, an engine control unit 62, an MG1 control unit 64 and an MG2 control unit 66.

The request power calculation unit 52 calculates a vehicle request power (hereafter also referred to as "request power") necessary for obtaining the driving force requested by the driver, based on, for instance, the depression amount of the accelerator pedal and the vehicle speed.

The engine start determination unit 54 determines whether to start the engine 2, based on the request power calculated by the request power calculation unit 52, and based on a charge and discharge request amount of the power storage device 16. Specifically, the engine start determination unit 54 outputs, to the HV control unit 60, a command instructing start of the engine 2, when a value resulting from adding the charge and discharge request amount (positive value for charging) of the power storage device 16 to the request power is equal to or higher than a predefined engine start threshold value. The charge and discharge request amount of the power storage device 16 is determined by the SOC; for instance, the charging request amount is larger when the SOC is low, whereas the discharge request amount is larger when the SOC is high.

The mode control unit 56 controls the charging mode (strong charging mode/weak charging mode/off state) based on the request signal Rsoc received from the SOC recovery switch 28. Specifically, the mode control unit 56 switches over to the strong charging mode, the weak charging mode and the off state, in this order, as illustrated in FIG. 3, every time that the request signal Rsoc is received from the SOC recovery switch 28 in response to the operation of the SOC recovery switch 28 by the user. The mode control unit 56 generates a mode signal MD denoting the state (including an off state) of the charging mode, outputs the mode signal MD to the charging promotion control unit 58, and outputs a state of mode for display also to the SOC recovery switch 28.

Herein, the mode control unit 56 measures the duration of the weak charging mode over the period of time during which the weak charging mode is selected. This duration measurement is accomplished by way of a timer, not shown. Once the weak charging mode has continued for a predefined time, the mode control unit 56 forcibly switches the charging mode from the weak charging mode to the strong charging mode, regardless of the operation of the SOC recovery switch 28. The predefined time is set beforehand, as appropriate, but a configuration may be resorted to wherein the predefined time can be set by the user.

The mode control unit 56 generates a mode signal MD that denotes the state (including an off state) of the charging mode, outputs the mode signal MD to the charging promotion control unit 58, and outputs a state of mode for display to the SOC recovery switch 28, also in a case where the charging mode has been forcibly switched to the strong charging mode due to the weak charging mode having continued for a predefined time. Preferably, the user is notified that forced switching to the strong charging mode has been carried out due to the weak charging mode having continued for a predefined time.

When the mode signal MD from the mode control unit 56 denotes the strong charging mode, the charging promotion control unit 58 outputs, to the HV control unit 60, a command instructing start of the engine 2 and forced charging of the power storage device 16 using the motor-generator 6, regardless of the determination result by the engine start determination unit 54. The engine 2 may be set to be started in that the charging promotion control unit 58 instructs the engine start determination unit 54 to lower the engine start threshold value, so as to cause the engine 2 to start.

When the mode signal MD from the mode control unit 56 denotes the weak charging mode, the charging promotion control unit 58 outputs, to the HV control unit 60, a command instructing promotion of charging of the power storage device 16 using the motor-generator 6 when start of the engine 2 has been instructed by the engine start determination unit 54.

Upon instruction of start of the engine 2 as a result of a command from the engine start determination unit 54 or the charging promotion control unit 58, the HV control unit 60 outputs, to the engine control unit 62, a command instructing the operation of the engine 2. To start the engine 2, the HV control unit 60 outputs, to the MG1 control unit 64, a command instructing powered driving of the motor-generator 6 for cranking the engine 2. Upon start of the engine 2, the HV control unit 60 outputs, to the MG1 control unit 64, a command instructing regenerative driving of the motor-generator 6. The HV control unit 60 further outputs, to the MG2 control unit 66, a command instructing driving of the motor-generator 10.

Upon reception, from the HV control unit 60, of the command instructing operation of the engine 2, the engine control unit 62 generates a control signal for operating the engine 2, and outputs the control signal to the engine 2. Upon reception, from the HV control unit 60, of the command instructing driving of the motor-generator 6, the MG1 control unit 64 generates a control signal for driving the power converter 18, and outputs the control signal to the power converter 18. Upon reception, from the HV control unit 60, of the command instructing driving of the motor-generator 10, the MG2 control unit 66 generates a control signal for driving the power converter 20, and outputs the control signal to the power converter 20.

Figure 7:
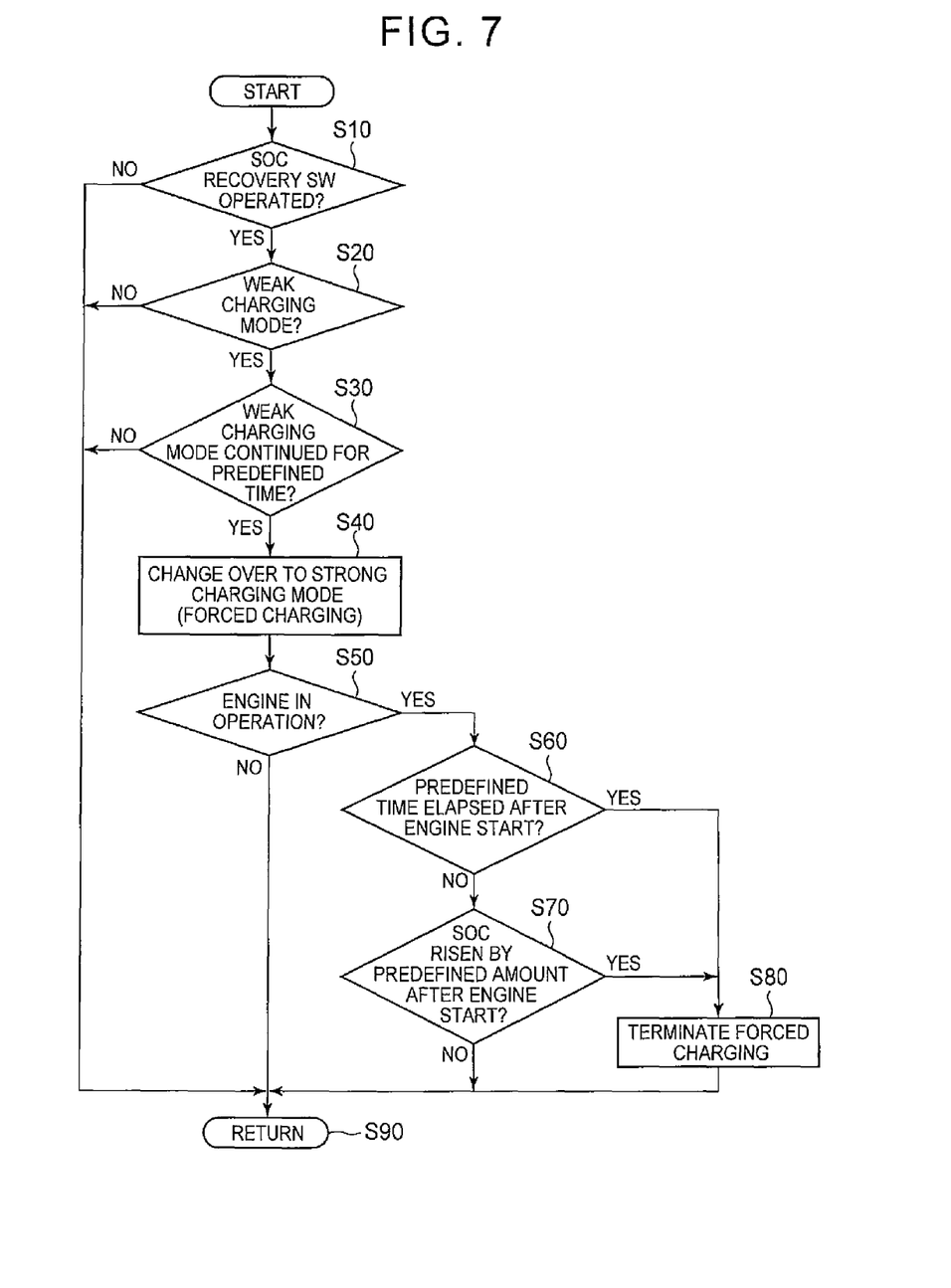
FIG. 7 is a flowchart for explaining a procedure of forced mode switching, with the weak charging mode selected, in the embodiment.

FIG. 7 is a flowchart for explaining a procedure of forced mode switching, with the weak charging mode selected. The flowchart is realized through provoking, by a main routine, of a program stored beforehand, and through execution of the program. Alternatively, all or some of the steps of the process in the flowchart can be implemented by relying on dedicated hardware (electronic circuitry).

With reference to FIG. 7, the ECU 26 determines whether the SOC recovery switch 28 has been operated (step S10). When the ECU 26 determines that the SOC recovery switch 28 has been operated (YES in step S10), the ECU 26 determines whether the weak charging mode has been selected through operation of the SOC recovery switch 28 (step S20).

When the ECU 26 determines that the charging mode is the weak charging mode (YES in step S20), the ECU 26 determines whether the weak charging mode has continued for a predefined time (step S30). If the weak charging mode has not continued for a predefined time (NO in step S30), the process is moved on to step S90.

When in step S30 the ECU 26 determines that the weak charging mode has continued for a predefined time (YES in step S30), the ECU 26 changes the charging mode over to the strong charging mode (forced charging) (step S40), regardless of the operation of the SOC recovery switch 28 (selection of the weak charging mode). Upon changeover to the strong charging mode, the ECU 26 starts forcibly the engine 2 regardless of the travel load, and charges the power storage device 16 using the engine 2 and the motor-generator 6, to execute thereby charging promotion control of promoting charging of the power storage device 16.

Next, the ECU 26 determines whether the engine 2 is in operation (step S50). Upon determination that the engine 2 is stopped (NO in step S50), the ECU 26 moves the process on to step S90.

When in step S50 the ECU 26 determines that the engine 2 is in operation (YES in step S50), the ECU 26 determines then whether a predefined time has elapsed or not after start of the engine 2 (step S60). This predefined time differs from the predefined time in step S30, and is a time for determining that the power storage amount in the power storage device 16 has risen by a given extent.

When in step S60 the ECU 26 determines that the predefined time has elapsed (YES in step S60), the ECU 26 terminates the forced charging initiated in step S40 (step S80).

When in step S60 the ECU 26 determines that a predefined time has not elapsed (NO in step S60), the ECU 26 determines then whether the SOC of the power storage device 16 has risen or not by a predefined amount after start of the engine 2 (step S70).

When in step S70 the ECU 26 determines that the SOC has risen by a predefined amount (YES in step S70), the ECU 26 moves the process on to step S80, and forced charging is terminated. When in step S70 the ECU 26 determines that the SOC has not risen by a predefined amount (NO in step S70), the ECU 26 moves the process on to step S90.

In the present embodiment, thus, there is provided the SOC recovery switch 28 for enabling the user to request an increase of the power storage amount in the power storage device 16. Upon request, through the SOC recovery switch 28, of an increase of the power storage amount, the power storage device 16 is charged by the engine 2 and the motor-generator 6 (charging promotion control) in such a manner that charging of the power storage device 16 is promoted. Charging promotion control includes the strong charging mode in which the power storage amount is increased early on, and a weak charging mode in which charging of the power storage device 16 is suppressed, when the travel load is small, as compared to when the travel load is large. In the weak charging mode, also the output of the engine 2 is limited when the travel load is small. Accordingly, there is suppressed operation of the engine 2 at a low load, which entails low efficiency and worse NV characteristics. Therefore, the present embodiment allows providing a hybrid vehicle wherein consideration can be given to efficiency and NV characteristics upon an increase of the power storage amount of the power storage device 16 in response to the request by the user.

In the present embodiment, the charging mode is switched to the strong charging mode when it is determined that the weak charging mode has continued for a predefined time. Accordingly, a situation is avoided where charging of the power storage device 16 is not promoted due to a continued state of small travel load during the weak charging mode. In consequence, the present embodiment allows increasing the power storage amount of the power storage device 16 in response to a request by the user, even for a continued state of small travel load.

Variation 1 is explained next. Forced changeover to the strong charging mode has been set above to take place when the weak charging mode has continued for a predefined time, but forced changeover to the strong charging mode may be set to take place in a case where charging is actually not performed for a predefined time, through continued low-load travel during the weak charging mode.

Figure 8:
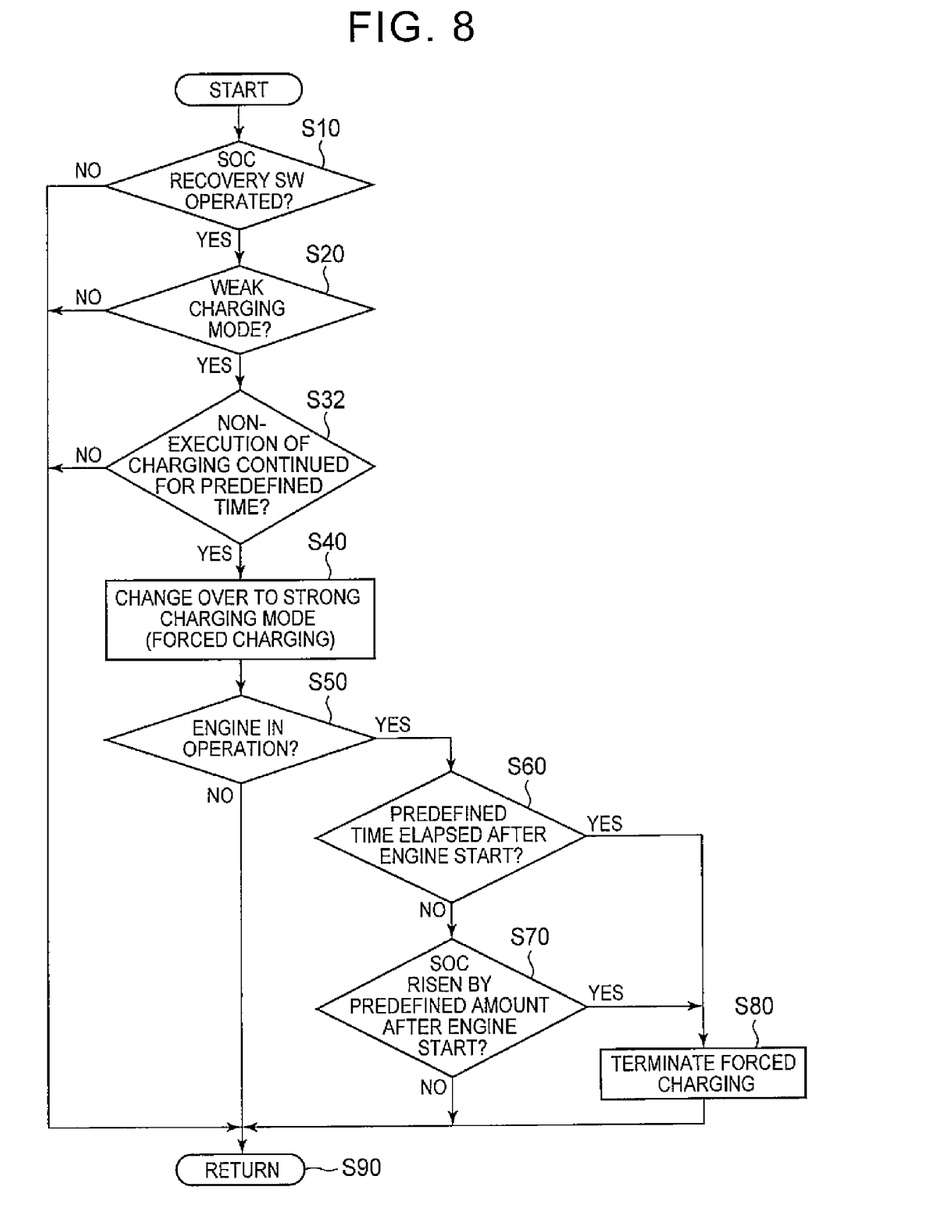
FIG. 8 is a flowchart for explaining a procedure of forced mode switching, with the weak charging mode selected, in Variation 1 of the embodiment.

FIG. 8 is a flowchart for explaining a procedure of forced mode switching, with the weak charging mode selected, in Variation 1. The flowchart in FIG. 8 has step S32 instead of step S30 of the flowchart illustrated in FIG. 7.

That is, when in step S20 the ECU 26 determines that the charging mode is the weak charging mode (YES in step S20), the ECU 26 determines whether non-execution of charging of the power storage device 16 has continued for a predefined time (step S32). In the weak charging mode the engine 2 stops when the travel load is small, as described above. Therefore, charging of the power storage device 16 is not executed if low-load travel is ongoing.

Accordingly, the process is moved on to step S40 and the ECU 26 changes the charging mode over to the strong charging mode (forced charging) regardless of the operation of the SOC recovery switch 28 (selection of the weak charging mode) when it is determined, in step S32, that non-execution of charging of the power storage device 16 has continued for a predefined time (YES in step S32). As a result, the engine 2 is started regardless of the travel load, and the power storage device 16 is forcibly charged.

When in step S32 the time during which charging of the power storage device 16 has not been executed does not continue for a predefined time (NO in step S32), the process is moved on to step S90. The process other than in step S32 is identical to that explained in FIG. 7.

Variation 2 is explained next. A decrease in the power storage amount (SOC) of the power storage device 16 at the time of the weak charging mode may be used as a condition for forcibly changing mode from the weak charging mode over to the strong charging mode.

Figure 9:
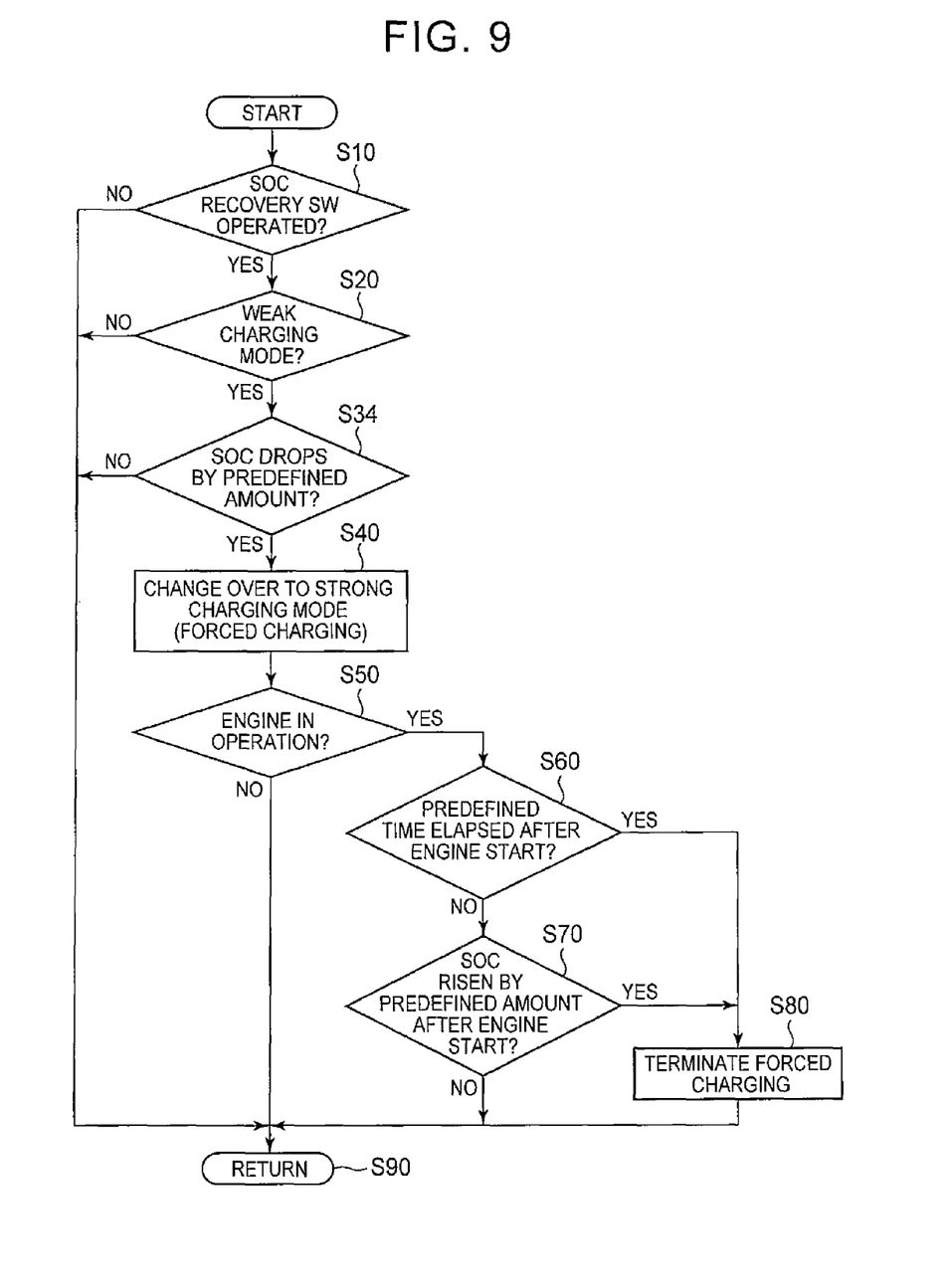
FIG. 9 is a flowchart for explaining a procedure of forced mode switching, with the weak charging mode selected, in Variation 2 of the embodiment.

FIG. 9 is a flowchart for explaining a procedure of forced mode switching, with the weak charging mode selected, in Variation 2. The flowchart in FIG. 9 has step S34 instead of step S30 of the flowchart illustrated in FIG. 7.

Specifically, when in step S20 the ECU 26 determines that the charging mode is the weak charging mode (YES in step S20), the ECU 26 determines whether the SOC of the power storage device 16 during selection of the weak charging mode has dropped by a predefined amount (step S34). In the weak charging mode the engine 2 stops when the travel load is small, as described above. Therefore, a situation may arise wherein the SOC drops, without execution of charging of the power storage device 16, if low-load travel is ongoing.

Accordingly, when in step S34 the ECU 26 determines that the SOC during selection of the weak charging mode has dropped by a predefined amount (YES in step S34), the process is moved on to step S40, and the ECU 26 changes the charging mode over to the strong charging mode (forced charging), regardless of the operation (selection of the weak charging mode) of the SOC recovery switch 28. As a result, the engine 2 is started regardless of the travel load, and the power storage device 16 is forcibly charged.

When in step S34 the ECU 26 determines that the SOC during selection of the weak charging mode has not dropped by a predefined amount (NO in step S34), the process is moved on to step S90. The process other than in step S34 is identical to that explained in FIG. 7.

Variation 3 is explained next. A travel distance in the weak charging mode may be used as the condition of forced changeover of the mode from the weak charging mode to the strong charging mode. If the travel distance in the weak charging mode is long, the power storage amount may conceivably fail to increase, since low-load travel is significant. Therefore, the mode is forcibly changed over to the strong charging mode.

Figure 10:
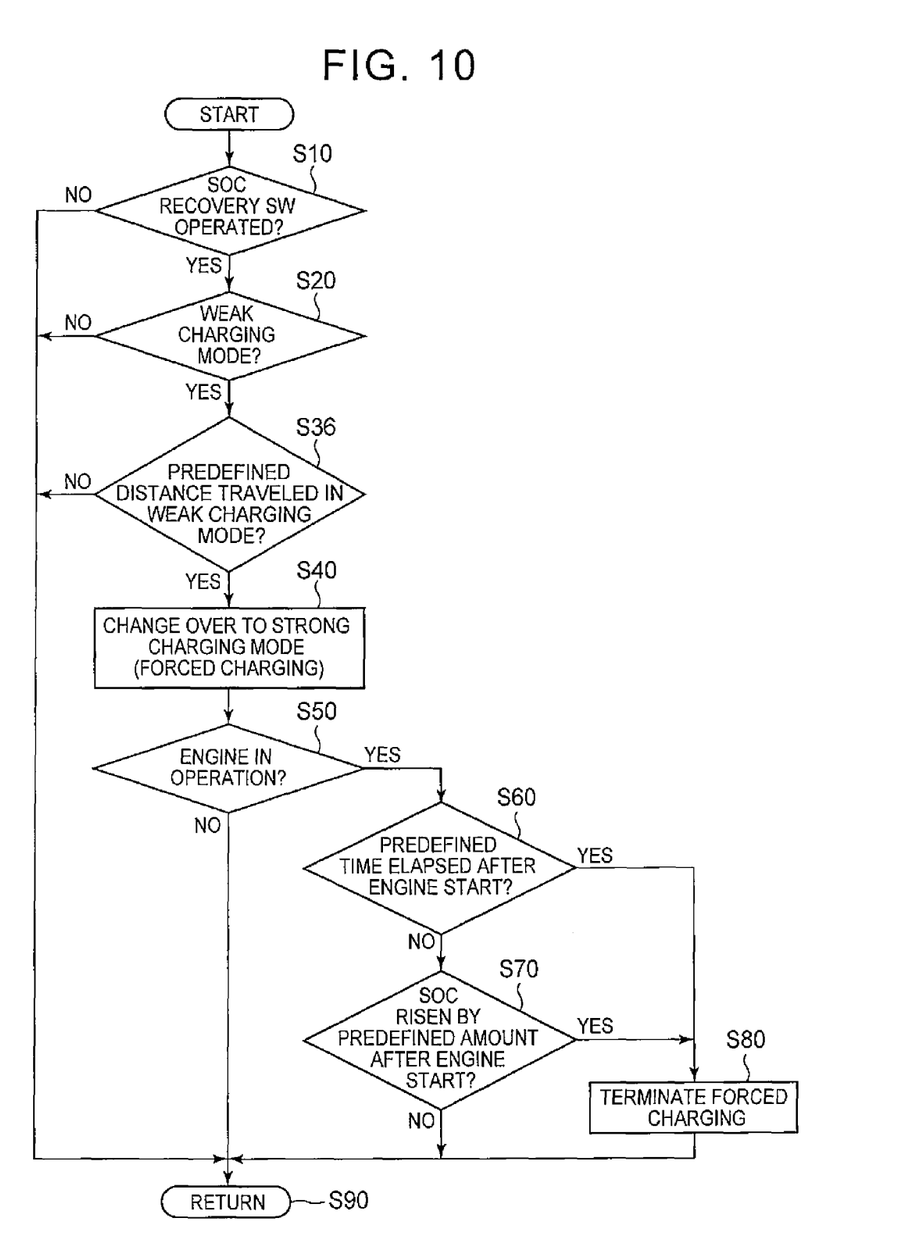
FIG. 10 is a flowchart for explaining a procedure of forced mode switching, with the weak charging mode selected, in Variation 3 of the embodiment.

FIG. 10 is a flowchart for explaining a procedure of forced mode switching, with the weak charging mode selected, in Variation 3. The flowchart in FIG. 10 has step S36 instead of step S30 of the flowchart illustrated in FIG. 7.

Specifically, when in step S20 the ECU 26 determines that the charging mode is the weak charging mode (YES in step S20), the ECU 26 determines then whether the vehicle has covered or not a predefined distance during selection of the weak charging mode (step S36). When in step S36 the ECU 26 determines that the vehicle has covered a predefined distance in the weak charging mode (YES in step S36), the process is moved on to step S40, and the ECU 26 changes the charging mode over to the strong charging mode (forced charging), regardless of the operation (selection of the weak charging mode) of the SOC recovery switch 28. As a result, the engine 2 is started regardless of the travel load, and the power storage device 16 is forcibly charged.

When in step S36 the ECU 26 determines that the vehicle has not covered a predefined distance in the weak charging mode (NO in step S36), the process is moved on to step S90. The process other than in step S36 is identical to that explained in FIG. 7.

In the above embodiments and variations, configurations are resorted to wherein two charging modes (strong charging mode/weak charging mode) can be selected through operation of the SOC recovery switch 28, but a configuration is also possible where the function of the strong charging mode is not provided. Specifically, charging of the power storage device 16 may be set to be suppressed, when the travel load is small, as compared to when the travel load is large, upon execution of a charging promotion control of promoting charging of the power storage device 16 when the SOC recovery switch 28 is turned on. In one example, the engine 2 and the power converter 18 are controlled in such a manner that SOC is increased when the engine 2 operates in accordance with the travel load, as at the time of selection of the weak charging mode. Specifically, charging promotion control is executed when the engine 2 is operating in accordance with the travel load, upon an increase of the state where the engine 2 is stopped, when the travel load is small as compared to when the travel load is large. In such a configuration as well, there is suppressed operation of the engine 2 at a low load, which entails low efficiency and worse NV characteristics. Therefore, it becomes possible to provide a hybrid vehicle wherein consideration can be given to efficiency and NV characteristics upon an increase of the power storage amount of the power storage device 16 in response to a request by the user.

In the above embodiment and variations thereof, the hybrid vehicle 100 is a series/parallel-type vehicle wherein the motive power of the engine 2 can be split by the motive power split device 4 and transmitted to the drive shaft 12 and the motor-generator 6, but the invention can be used in hybrid vehicles of other types. For instance, the invention can be used in a so-called series-hybrid vehicle in which the engine 2 is used only for driving the motor-generator 6, and driving force in the vehicle is generated at the motor-generator 10 alone, or in a hybrid vehicle in which only regenerative energy, from among the kinetic energy generated by the engine, is recovered in the form of electrical energy, or in a motor-assist hybrid vehicle in which the engine, which provides the main motive power, is assisted by a motor, as needed.

In the disclosure above, the engine 2 is an example of the "internal combustion engine" of the invention. The motor-generator 6 is an example of the "power generation device" of the invention. The ECU 26 is an example of the "electronic control unit" of the invention. The SOC recovery switch 28 is an example of the "input device" of the invention.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A hybrid vehicle, comprising:
a power storage device;
an internal combustion engine;
a power generation device configured to generate charging power of the power storage device by using an output of the internal combustion engine;
an input device configured to request an increase of a power storage amount of the power storage device by a user input; and
an electronic control unit configured to control charging of the power storage device by the power generation device in such a manner that charging of the power storage device is promoted when the increase of the power storage amount is requested through the input device, the electronic control unit being configured to, in a state where the increase of the power storage amount has been requested through the input device, suppress charging of the power storage device when a travel load is small in comparison to when the travel load is large, and the electronic control unit being configured to mitigate suppression of charging of the power storage device when a predefined condition is met during suppression of charging of the power storage device.

2. The hybrid vehicle according to claim 1, wherein
the electronic control unit is configured to suppress charging of the power storage device by increasing a state where the power generation device is stopped, when the travel load is small in comparison to when the travel load is large.

3. The hybrid vehicle according to claim 1, wherein
the electronic control unit is configured to include a charging promotion control unit and a mode control unit, the charging promotion control unit is configured to control charging of the power storage device by the power generation device in such a manner that charging of the power storage device is promoted when the increase of the power storage amount is requested through the input device, and the mode control unit is configured to, during execution of charging control by the charging promotion control unit, control switching between a strong charging mode in which the power storage amount is increased early on, and a weak charging mode in which charging of the power storage device by the power generation device is suppressed when the travel load is small, in comparison to when the travel load is large, the mode control unit being configured to switch from the weak charging mode to the strong charging mode when the predefined condition is met during the weak charging mode.

4. The hybrid vehicle according to claim 3, wherein
the predefined condition is that the weak charging mode has continued for a predefined time.

5. The hybrid vehicle according to claim 3, wherein
the predefined condition is that non-execution of charging of the power storage device by the power generation device has continued for a predefined time.

6. The hybrid vehicle according to claim 3, wherein
the predefined condition is that the power storage amount decreases by a predefined amount while the weak charging mode is selected.

7. The hybrid vehicle according to claim 3, wherein
the predefined condition is that the hybrid vehicle has traveled a predefined distance while the weak charging mode is selected.

8. The hybrid vehicle according to claim 3, wherein
the internal combustion engine is configured to start when the travel load increases and to stop when the travel load decreases, and the charging promotion control unit is configured to execute charging of the power storage device by the power generation device, during operation of the internal combustion engine in accordance with the travel load, when the weak charging mode has been selected by the mode control unit.

9. The hybrid vehicle according to claim 3, wherein
the mode control unit is configured to switch between the strong charging mode and the weak charging mode based on the user input through the input device.

10. The hybrid vehicle according to claim 1, wherein
the electronic control unit is configured to control charging of the power storage device by the power generation device so as to increase a state of charge of the power storage device, when the increase of the power storage amount is requested through the input device.

11. The hybrid vehicle according to claim 1, wherein
the electronic control unit is configured to control charging of the power storage device by the power generation device so as to increase a charge rate of the power storage device, when the increase of the power storage amount is requested through the input device.

12. A method for controlling a hybrid vehicle, the hybrid vehicle including a power storage device, an internal combustion engine, a power generation device generating charging power of the power storage device by using an output of the internal combustion engine, and an input device to request an increase of a power storage amount of the power storage device by a user input, the control method comprising:

controlling charging of the power storage device by the power generation device in such a manner that charging of the power storage device is promoted when an increase of the power storage amount is requested through the input device;

suppressing charging of the power storage device when a travel load is small in comparison to when the travel load is large, and mitigating suppression of charging of the power storage device when a predefined condition is met during suppression of charging of the power storage device, in a state where the increase of the power storage amount has been requested through the input device.

* * * * *